May 7, 1935.  M. L. NORRIS  2,000,713
CLUTCH
Filed May 10, 1929
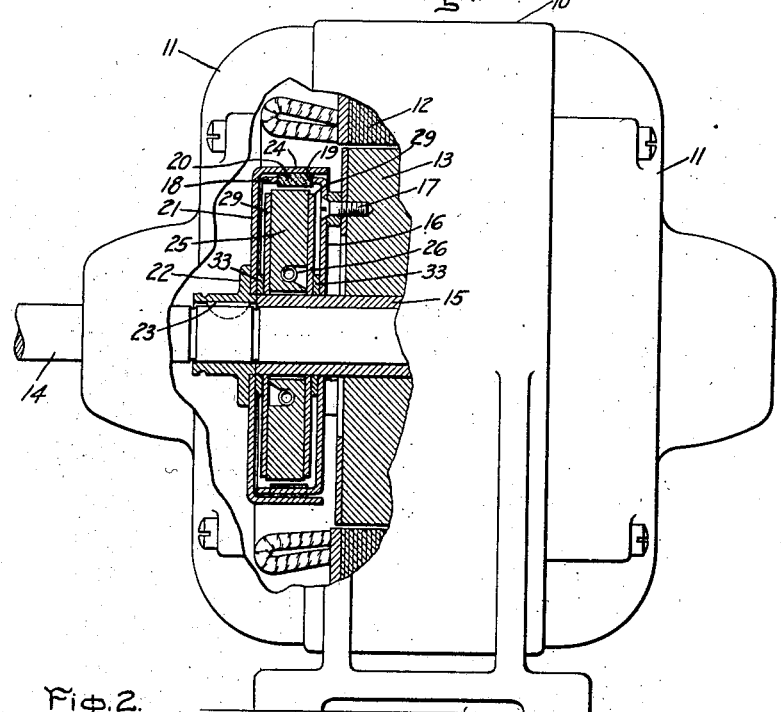
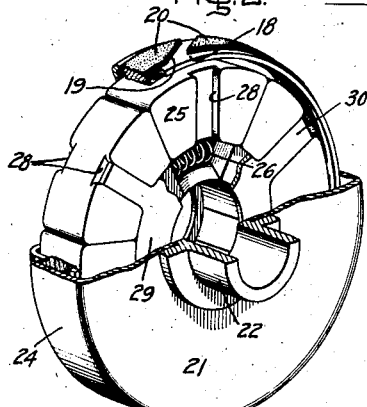
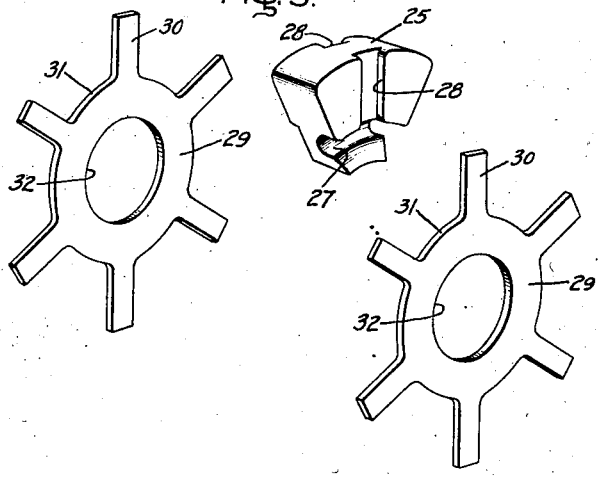
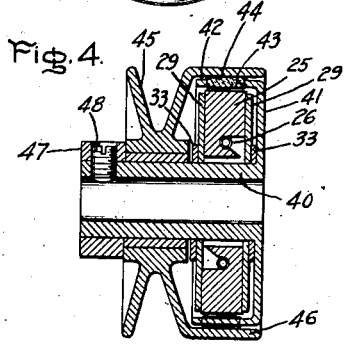
Inventor:
Marvin L. Norris,
by Charles E. Tullar
His Attorney.

Patented May 7, 1935

2,000,713

UNITED STATES PATENT OFFICE 2,000,713

CLUTCH

Marvin L. Norris, Fort Wayne, Ind., assignor to General Electric Company, a corporation of New York Application May 10, 1929, Serial No. 362,007

39 Claims. (Cl. 192—105)

My invention relates to clutches generally and, more particularly, to clutches of the type in which the connection between the driving and driven members of the clutch is controlled by a centrifugal device.

An object of my invention is to provide a simple and compact clutch construction.

Another object of my invention is to provide a clutch construction which permits the driving member to attain substantially full speed, before the load to be driven is applied thereto, and which then suddenly applies the load to the driving member so as to utilize the kinetic energy of the driving member and the power device connected thereto to obtain high initial starting torque for the load.

Further objects and advantages of my invention will become apparent as the following description proceeds, and the features of novelty which characterize my invention will be pointed out with particularity in the claims annexed to and forming a part of this specification.

Fig. 1 is a side elevation of a motor having a centrifugal clutch embodying my invention arranged inside of the end head thereof, and partly broken away to more clearly show the construction; Fig. 2 is a perspective view of the clutch structure shown in Fig. 1, partly broken away; Fig. 3 is a perspective view of the supporting members and one of the weights of the centrifugal device employed in my improved clutch, and Fig. 4 is a longitudinal section of a driving pulley having my improved clutch applied thereto.

In Fig. 1 of the drawing I have shown my improved clutch in connection with an electric motor including a frame 10 having end heads 11 in which the motor shaft bearings are supported, a core structure 12, and a rotatable member 13 mounted on the shaft 14 of the motor. The rotatable member 13 is provided with a bushing 15 pressed therein, or otherwise secured thereto, which is loosely mounted on the shaft 14, so that when the motor is started the rotatable member can come up to full speed without the resisting torque of the load connected to the shaft 14 being applied to the rotatable member.

When the motor is started it is desirable that the rotatable member 13 be permitted to come up to substantially full speed before the load is applied thereto, and that the load then be suddenly applied thereto so as to utilize the high kinetic energy of the rotor to give high starting torque with low starting current. In accordance with my invention, I accomplish this by providing a centrifugal device for actuating the clutch which can be brought up to sufficient speed to actuate the same and then suddenly connect the driving and driven members only an interval after the driving member has attained full speed, or if desired, any predetermined speed. As an example of one manner of carrying out my invention, I have shown a clutch, in Figs. 1 to 3 including a driving member 16 secured to the rotatable member 13 by screws 17, or in any other suitable manner. The outer peripheral portion or projection 18 of this member extends axially of the shaft 14 and is formed with a plurality of openings or recesses 19 in which friction elements 20 are loosely arranged. The driven member 21 of the clutch is secured to a hub 22 which is keyed to the shaft 14 at 23. The driven member is provided with a peripheral portion 24 extending axially of the shaft 14 and surrounding the portion 18 of the driving member and the friction elements 20. It will thus be seen that the driving and driven members of the clutch are cup-shaped, the mouth of one being arranged adjacent the bottom of the other to form a substantially closed casing for the clutch.

The friction elements 20, which may be of cork composition or other suitable material, are retained in the openings 19 adjacent the peripheral portion 24 of the driven member by an annulus of centrifugally actuated weights 25 which rotate out of engagement with the friction elements until the weights 25 attain sufficient speed to move them outwardly against the action of an annular spring 26 and into engagement with the friction elements 20 so as to urge the friction elements against the driven member and connect the driving member thereto. When the motor is started, and before the weights 25, which are arranged within the friction elements, are thrown outwardly against the friction elements, the latter are in contact with the peripheral portion 24 of the driven member, but do not exert sufficient force to appreciably retard the starting of the rotatable member 13 of the motor.

In order to insure the motor reaching full speed before the load is applied thereto, I arrange the centrifugally actuated weights 25 so as to connect the driving and driven members of the clutch, and apply the load which is driven by the shaft 14 to the rotatable member 13 of the motor, an interval after the rotatable member 13 of the motor attains full speed. I do this by loosely supporting the centrifugal device, including the weights 25, on the bushing 15, which extends to the hub 22 and is rotatable with the driving member 16, so that the frictional resistance between the centrifugal device and the bushing will be comparatively low. By this arrangement, when the motor is started the centrifugal device, due to its inertia, lags considerably behind the bushing 15, so that it attains sufficient speed to actuate the weights 25 only an appreciable interval after the driving member 16 and the bushing 15 attain full speed. During this starting period the bushing and the driving member are quickly accelerated to full speed of the rotatable member 13 to which they are rigidly connected. The centrifugal device may be of any construction which will function as above set forth, but it preferably consists of spring retained weights which are arranged between the supporting members or plates. In the form of the centrifugal device illustrated the weights 25 are provided with notches 27 adapted to engage the annular spring 26 which retains them adjacent the axis of rotation of the device, and with recesses 28. The weights 25 are arranged between supporting members or plates 29 having arms 30 slidably engaging the recesses or guideways 28 formed in the weights. When the centrifugal device is at rest the weights 25 are retained against the edges 31 of the plates 29 by the spring 26 and out of engagement with the bushing 15, as the plates 29 are formed with openings 32 providing a loose fit on the bushing and of slightly smaller diameter than the inner periphery of the weights 25 in their retracted position, in which position they are shown in Figs. 1, 2 and 4. The arms 30 of the plates 29 serve to drive the weights 25 and also to guide them throughout the range of their radial outward movement.

The edges of the plates 29 about the openings 32 afford small bearing surfaces between the plates and the bushing 15, so that the friction resistances of the plates 29 on the bushing is low enough to cause the centrifugal device to lag with respect to the bushing when the latter is accelerated in starting. As a result, the centrifugal device attains sufficient speed to actuate the same an appreciable interval after the bushing and the driving member attain full speed, or any predetermined speed. Moreover, the small bearing surfaces prevent an accumulation of dust or dirt interfering with the lag of the centrifugal device with respect to the bushing and the driving member of the clutch. The weights 25 of the centrifugal device are assembled in the clutch with the notches 27 of adjacent weights extending in opposite directions axially of the clutch, and the device is loosely supported on the bushing 15 between spacing washers 33. These washers are loosely fitted on the bushing 15 and retain the device out of engagement with the ends of the driving and driven members.

In the operation of the form of my invention shown in Figs. 1, 2 and 3, when the motor is started the rotatable member 13 having the driving member 16 of the clutch secured thereto, and the bushing 15 are quickly accelerated to full speed of the motor and the friction elements 20 rotate freely inside of the driven member 21. The centrifugal device, including the weights 25, are accelerated at a much slower rate than the rotatable member 13 and the bushing 15, because the friction of the plates 29 on the bushing is small compared to the resisting forces due to the inertia of the weights 25 and the other parts of the centrifugal device. As a result, the weights of the centrifugal device are slowly accelerated by the plates 29 so that they attain sufficient speed to actuate the same only an appreciable interval after the rotatable member 13 has attained full speed. The centrifugal force acting on the weights 25 varies as the square of the speed, and the centrifugal device is increasing in speed when the weights 25 are moved outwardly against the moving friction elements 20, so that when the centrifugal device attains sufficient speed to move the weights 25 outwardly against the friction elements, the weights quickly move outwardly with considerable force. The centrifugal device is not retarded when the weights come in contact with the friction elements, but is quickly accelerated to the speed of the driving member 18 as the friction elements are moving at the speed of the rotatable member 13. The sudden engagement of the weights and the friction elements is very desirable, as it immediately connects the driving member 16 of the clutch to the driven member 21, which is keyed to the shaft 14, with very slight slipping of the friction elements on the driven member. As a result, the large amount of kinetic energy which is stored in the rotatable member 13 of the motor due to its speed of rotation is utilized to give a very high initial starting torque to the load connected to the shaft 14 without requiring excessive starting current for the motor.

In Fig. 4 my improved clutch is shown in connection with a pulley, but it will be understood that it may be of any other form of torque transmitting device. In this construction a driving member or sleeve 40, which is adapted to be secured to any suitable driving shaft, or other power device, is formed with an annular flange 41, the outer peripheral portion 42 of which extends axially of the sleeve, and is provided with openings 43 in which friction elements 44 are loosely arranged. The pulley 45 is rotatably fitted on the sleeve 40 and formed with a flange 46, which surrounds the friction elements 44 and the portion 42 of the flange extending from the sleeve 40. The centrifugal device is the same construction as that shown in Figs. 1, 2 and 3, and for convenience, the parts thereof are designated by the same reference characters. The pulley and the centrifugal device are retained on the sleeve by a removable collar 47 having a set screw 48 extending through the sleeve which is adapted to engage the drive shaft on which the sleeve is arranged to secure the same thereto. The centrifugal device is loosely mounted on the sleeve 40 and the washers 33 retain the centrifugal device in the desired relation to the friction elements and out of engagement with the flange 41 and the pulley 45.

In the operation of the construction shown in Fig. 4, when the driving member or sleeve 40 is accelerated, as in the case when the sleeve is secured to the shaft of a motor which is being started, the pulley 45 is maintained stationary by the resisting torque of the load which is transmitted thereto by a belt. The peripheral portion 42 of the sleeve 40, and the friction elements 44 are quickly accelerated with the sleeve 40 to substantially full speed of the driving member. The centrifugal device, including the weights 25, lags with respect to the sleeve 40 so that it attains sufficient speed to actuate the same, and to move the weights outwardly into engagement with frictional elements 44, an appreciable interval after the sleeve 40 has attained full speed. The lagging of the centrifugal device with respect to the sleeve is in this construction, as in the construction shown in Figs. 1 to 3, due to the fact that the friction between the plates 29 of the centrifugal device and the sleeve 40 is small as compared to the inertia forces of the centrifugal device during acceleration of the sleeve in starting.

Although I have shown my improved clutch as applied to an electric motor and as applied to a belt pulley, I do not desire my invention to be limited to the arrangements shown and described, and I intend in the appended claims to cover all modifications thereof which do not depart from the spirit and scope of my invention.

What I claim as new and desire to secure by Letters Patent of the United States is:

1. A clutch including two members arranged one within the other, one of said members having openings therein, friction elements arranged in the openings in the one of said members, and means including a centrifugal device frictionally connected to said driving member for urging said friction elements against the other of said members.

2. A clutch including a driven member and a driving member arranged therein, said driving member having openings therein, friction elements arranged in the openings in said driving member, and means including a centrifugal device frictionally connected to said driving member and arranged inside of said members for urging said friction elements against said driven member to connect the driving member thereto.

3. A clutch including a driven member and a driving member arranged therein, said members constituting a substantially closed casing for the clutch, said driving member having openings therein, friction elements loosely arranged in the openings in said driving member, and means including a centrifugal device frictionally connected to said driving member and arranged inside of said members for urging said friction elements against said driven member to connect the driving member thereto.

4. A clutch including a driven member and a driving member arranged therein, said members constituting a substantially closed casing for the clutch, said driving member having openings therein, friction elements loosely arranged in the openings in said driving member, and means including a centrifugal device frictionally connected to one of said members and arranged inside of said members for retaining said friction elements in the openings in said driving member and for urging them against said driven member to connect the driving member thereto.

5. A clutch including a driven member and a driving member arranged therein, said driving member having openings therein, friction elements arranged in the openings in said driving member, and means arranged entirely inside of said members and controlled by the rotation of one of said members for urging said friction elements against said driven member to connect the driving member thereto.

6. A clutch including a driven member and a driving member arranged therein, said driving member having openings therein, friction elements arranged in the openings in said driving member, and means including a centrifugal device arranged entirely inside of said members and controlled by said driving member for urging said friction elements against said driven member to connect the driving member thereto.

7. A clutch including a driven member and a driving member arranged therein, said driving member having openings therein, friction elements arranged in the openings in said driving member, centrifugally actuated weights arranged inside of said members for urging said friction elements against said driven member to connect the driving member thereto, and means whereby said weights can attain sufficient speed to actuate the same only an interval after said driving member has attained a predetermined speed.

8. A clutch including a driven member and a driving member arranged therein, said members constituting a substantially closed casing for the clutch, said driving member having openings therein, friction elements loosely arranged in the openings in said driving member, and means inside of said members for retaining said friction elements in the openings in said driving member and for urging them against said driven member to connect the driving member thereto, said means being controlled by the rotation of one of said members.

9. A clutch including a driven member and a driving member arranged therein, said members constituting a substantially closed casing for the clutch, said driving member having openings therein, friction elements loosely arranged in the openings in said driving member, and means including a centrifugal device inside of said members for retaining said friction elements in the openings in said driving member and for urging them against said driven member to connect the driving member thereto.

10. A clutch including a driven member and a driving member arranged therein, said members constituting a substantially closed casing for the clutch, said driving member having openings therein, friction elements loosely arranged in the openings in said driving member, means including a centrifugal device inside of said members for retaining said friction elements in the openings in said driving member and for urging them against said driven member to connect the driving member thereto, and means whereby said centrifugal device can attain sufficient speed to actuate the same an interval after the driving member attains a predetermined speed.

11. A clutch including driving and driven members, and means including centrifugally actuated weights frictionally connected to said driving member for connecting said members, means for urging said weights toward the axis of rotation of said weights, and plates separate from said driving member and arranged on opposite sides of said weights for supporting them in operative relation to each other.

12. A clutch including driving and driven members, and means including centrifugally actuated weights frictionally connected to said driving member for connecting said members, means for urging said weights toward the axis of rotation of such weights, and plates separate from said driving member and arranged on opposite sides of said weights for supporting them in operative relation to each other, said plates being mounted on said driving member and arranged to drive said weights.

13. A clutch including driving and driven members, means including centrifugally actuated weights for connecting said members, means for urging said weights toward the axis of rotation of said weights, and plates on opposite sides of said weights for supporting them in operative relation to each other, said plates being frictionally mounted on said driving member so as to be driven thereby and arranged to drive said weights.

14. A clutch including driving and driven members, means including centrifugally actuated weights for connecting said members, said weights being formed to receive a spring and having recesses in the sides thereof, an annular spring engaging said weights to urge them toward the axis of rotation of the clutch, and members on opposite sides of said weights having arms slidably engaging the recesses in the sides of said weights.

15. A clutch including driving and driven members, means including centrifugally actuated weights for connecting said members, said weights having notches therein to receive a spring and recesses in the sides thereof, an annular spring arranged in the notches in said weights, said weights being assembled with the notches of adjacent weights opening in opposite directions axially of said device, and flat plates on opposite sides of said weights having arms engaging the recesses in said weights.

16. A clutch including a shaft and a sleeve having an axially extending annular flange, said sleeve being loosely mounted on said shaft, a torque transmitting member loosely arranged on said sleeve inside of said annular flange and secured to said shaft, means for connecting said sleeve to said torque transmitting member including a centrifugal device loosely arranged on said sleeve so as to be brought up to sufficient speed to actuate the same when said sleeve is started an interval after the sleeve attains a predetermined speed.

17. A clutch including a sleeve having an annular flange, the outer peripheral portion of said flange extending axially of said sleeve and having openings therein, friction elements in the openings in said flange, a torque transmitting member loosely arranged on said sleeve, and surrounding said friction elements, and means for connecting said sleeve to said torque transmitting member including a centrifugal device arranged between said torque transmitting member and said flange inside of the peripheral portion of the latter for retaining said friction elements in place, said centrifugal device being loosely arranged on said sleeve so as to be brought up to sufficient speed to actuate the same when the sleeve is started an interval after the sleeve attains a predetermined speed.

18. A clutch including driving and driven members, means including a centrifugally actuated weight for connecting said members, means for urging said weight toward the axis of rotation of said clutch, flat supporting plates having arms engaging opposite sides of said weights and having small bearing surfaces for loosely supporting said weight with low frictional resistance on one of said members so that said weight will be brought up to sufficient speed to connect said members an interval after said driving member has attained a predetermined speed.

19. A clutch including driving and driven members, means including an annulus of centrifugally actuated weights for connecting said members, said weights being formed to receive an annular spring and having recesses in the sides thereof, supporting plates on opposite sides of said weights arranged on said driving member, said supporting plates having central openings of lesser diameter than the inner periphery of said weights providing small bearing surfaces for supporting said weights with low frictional resistance on said driving member, so that upon starting said driving member said weights will be brought up to sufficient speed to connect said members an interval after said driving member has attained a predetermined speed.

20. A clutch including a driven member and a driving member arranged therein, said driving member having recesses therein, friction elements arranged in the recesses in said driving member, and means including a centrifugal device frictionally connected to said driving member and arranged inside of said members for urging said friction elements against said driven member to connect the driving member thereto.

21. A clutch including a driven member and a driving member arranged therein, said members constituting a substantially closed casing for the clutch, outwardly movable friction elements loosely carried by the periphery of said driving member and arranged to be driven thereby, and means including an outwardly expanding centrifugal device frictionally connected to said driving member and arranged inside of said members between the axis of the clutch and said friction elements for urging said friction elements outwardly against said driven member to connect the driving member thereto.

22. A clutch including a driven member and a driving member arranged therein, said members constituting a substantially closed casing for the clutch, outwardly movable friction elements loosely carried by the periphery of said driving member and arranged to be driven thereby, and means including an outwardly expanding centrifugal device frictionally connected to one of said members and arranged inside of said members for retaining said friction elements in driving relation to said driving member and for urging them outwardly against said driven member to connect the driving member thereto.

23. A clutch including a driven member and a driving member arranged therein, outwardly movable friction elements loosely carried by the outer periphery of said driving member and arranged to be driven thereby, and means arranged entirely inside of said members between the axis of the clutch and said friction elements and controlled by the rotation of one of said members for expanding outwardly in urging said friction elements outwardly against said driven member to connect the driving member thereto.

24. A clutch including a driven member and a driving member arranged therein, said members constituting a substantially closed casing for the clutch, outwardly movable friction elements loosely carried by the periphery of said driving member and arranged to be driven thereby, and means inside of said members for retaining said friction elements in driving relation to said driving member and for expanding outwardly in urging them against said driven member to connect the driving member thereto, said means being controlled by the rotation of one of said members.

25. A clutch including a driven member and a driving member arranged therein, said members constituting a substantially closed casing for the clutch, outwardly movable friction elements loosely carried by the periphery of said driving member and arranged to be driven thereby, and means including an outwardly expanding centrifugal device inside of said members for retaining said friction elements in driving relation to said driving member and for urging them against said driven member to connect the driving member thereto.

26. A centrifugal clutch consisting of a driving member having a radial disk, a coaxial drum, a complement of arcuate friction elements for engagement with said drum, driving means projecting from the disk and fitting between the friction elements, a complement of blocks disposed about the axis of rotation of the driving member and engaged with said friction elements, and a ring frictionally engaging the driving member and so directly supporting the blocks that they may be thrown outwardly by centrifugal force.

27. A centrifugal clutch including a driving member having a rigid axially projecting portion, a driven member, a friction element loosely mounted on said projecting portion of said driving member and positively driven thereby adapted to be urged into driving engagement with the said driven member, and means rotatable by frictional connection with the driving member so as to move radially under centrifugal force to apply clutching pressure directly on the friction element.

28. A centrifugal clutch including a driving member, a driven drum, a complement of friction elements each in an arc of a circle adapted to be urged into engagement with the said drum, a positive driving connection between said driving member and the friction elements, and means adapted to be revolved by frictional contact with the driving member and to present an annular surface engageable with the friction elements so as to radially urge them against the drum by centrifugal force.

29. A centrifugal clutch including a driving member, a driven member in the form of a drum having an internal contact face, a friction element adapted to be urged into engagement with the said face, a positive driving connection between said driving member and the friction element, and an element rotatable by frictional connection with the driving member so as to move outwardly under centrifugal force to apply clutching pressure directly on the friction element, said element having a curved peripheral face engageable with the friction element.

30. A centrifugal clutch including a driving member, a driven member in the form of a drum having an internal contact face, a complement of friction shoes adapted to be brought into engagement with the said face, a positive driving connection between said driving member and the friction shoes, and means revolved by frictional contact with the driving member to radially urge the friction shoes into driving engagement with the drum face by centrifugal force, said means presenting a curved surface conforming with the friction shoes.

31. A centrifugal clutch including a driving member having a rigid axially projecting portion, a driven member, a complement of friction shoes loosely mounted on said projecting portion of said driving member and positively driven thereby for engagement with said driven member, and means adapted to be revolved by frictional contact with the driving member in order to apply pressure directly on the friction shoes by centrifugal force, said means presenting a curved surface engageable with the friction shoes.

32. A centrifugal clutch including a driving member, a driven member, a complement of friction elements for engagement with said driven member, a positive driving connection between said driving member and the friction elements, and frictionally driven blocks adapted to directly apply pressure on said friction elements by centrifugal force, said blocks being arranged between said complement of friction elements and the axis of rotation of said driving member.

33. A centrifugal clutch including a driving member having a rigid axially projecting portion, a driven member, a complement of friction elements loosely mounted on said projecting portion of said driving member and positively driven thereby for engagement with said driven member, and a complement of floating blocks disposed about the axis of rotation of the driving member and frictionally driven thereby to directly apply pressure on the friction elements by centrifugal force.

34. A centrifugal clutch including a driving member, a driven drum, a complement of friction elements each in an arc of a circle and adapted to be brought into driving engagement with said drum, a positive driving connection between said driving member and the friction elements, a complement of blocks disposed about the axis of rotation of the driving member and presenting an annular surface engageable with said friction elements, and means having frictional contact with said driving member and directly so supporting the blocks that they may be thrown outwardly by centrifugal force.

35. A centrifugal clutch including a driving member having a rigid axially projecting portion, a driven member, a complement of friction elements loosely mounted on said projecting portion of said driving member and positively driven thereby for engagement with said driven member, a complement of blocks disposed about the axis of rotation of the driving member and engageable with said friction elements, and a ring frictionally engaging the driving member and directly so supporting the blocks that they may be thrown outwardly by centrifugal force, said blocks presenting an annular surface directly engageable with the friction elements.

36. A centrifugal clutch including a driving member having a rigid axially projecting portion, a driven member, a complement of friction elements loosely mounted on said projecting portion of said driving member and positively driven thereby for engagement with said driven member, a complement of blocks disposed about the axis of rotation of the driving member and engageable with said friction elements, a ring having frictional engagement with said driving member, guide means borne by said ring supporting the blocks to enable them to move outwardly under centrifugal force and directly urge said friction elements into driving engagement with said driven member.

37. A centrifugal clutch including a driving member having a rigid portion projecting radially and axially therefrom, a driven member, a complement of friction elements loosely mounted on said axially projecting portion of said driving member and positively driven thereby for engagement with said driven member, a complement of blocks disposed about the axis of rotation and directly engaged with said friction elements, said blocks being provided with radial guideways, a ring journalled upon the driving member, arms radially projecting therefrom and slidably fitting in the guideways in the blocks to support them around the ring, and means applying pressure upon the blocks to retard their outward movement under centrifugal force.

38. A centrifugal clutch including a disk and a central boss thereon constituting a driving member, a drum, a complement of arcuate friction elements for engagement with said drum, means projecting from said disk and fitting between the friction elements for driving the same, a complement of segmental blocks comprising a ring and arranged within the complement of friction elements, and means adapted to be revolved by frictional contact with the driving member in order to apply radial pressure on the blocks by centrifugal force.

39. A centrifugal clutch including a driving member, a drum having an internal annular clutch face, a complement of friction elements for engagement with said clutch face, said driving member having a projection fitting between the adjacent ends of the friction elements, a complement of segmental blocks comprising a ring arranged within the friction elements, and means adapted to be revolved by frictional contact with the driving member in order to apply pressure on the blocks by centrifugal force.

MARVIN L. NORRIS.